Aug. 6, 1940. C. T. ELDERKIN Re. 21,523
PULVERIZER
Original Filed June 28, 1937
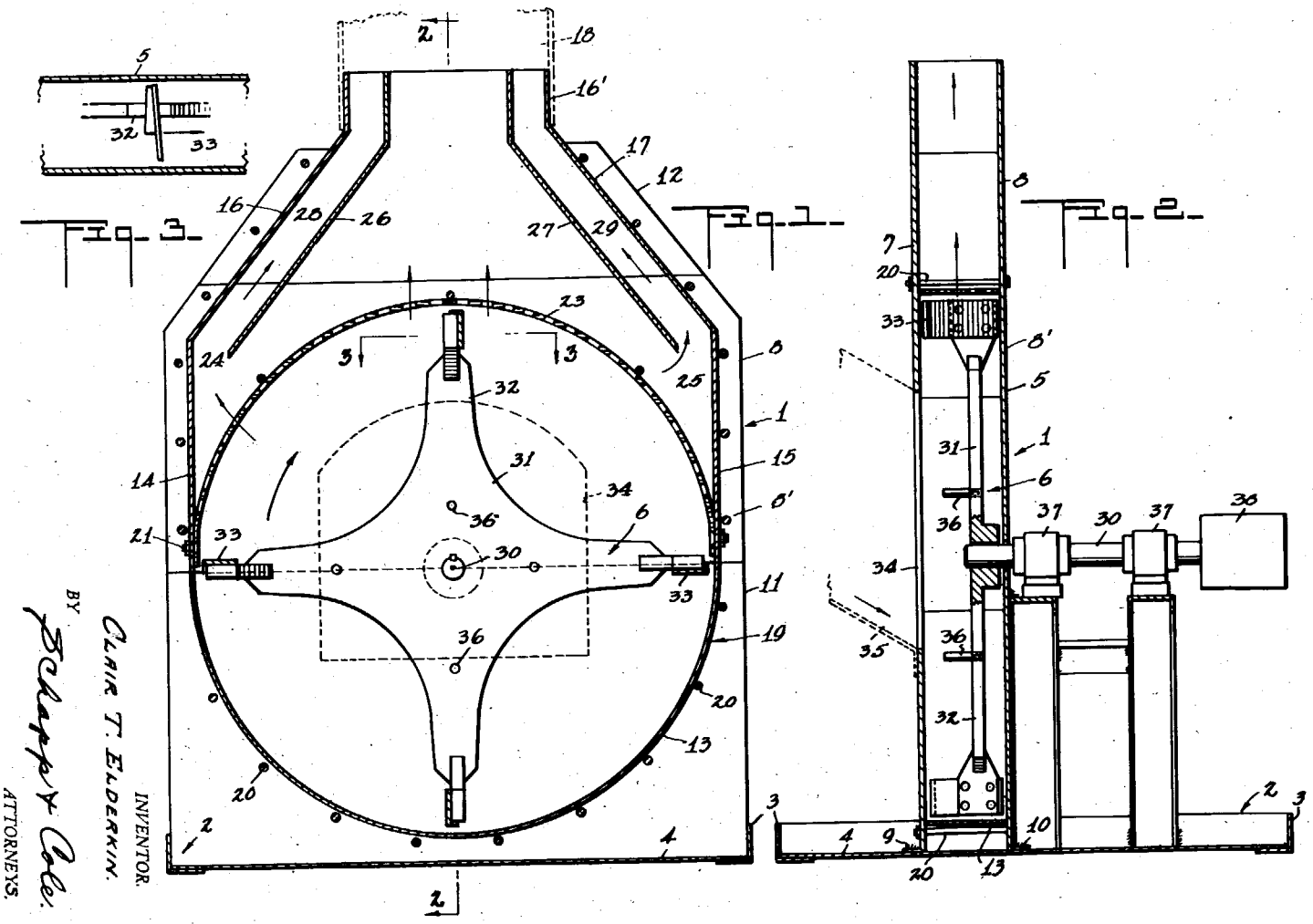
INVENTOR.
CLAIR T. ELDERKIN.
BY Schapp & Cole.
ATTORNEYS.

Reissued Aug. 6, 1940 Re. 21,523

UNITED STATES PATENT OFFICE 21,523

PULVERIZER

Clair T. Elderkin, Zamora, Calif., assignor, by mesne assignments, to Miller Manufacturing Company, a corporation of California Original No. 2,128,727, dated August 30, 1938, Serial No. 150,735, June 28, 1937. Application for reissue October 23, 1939, Serial No. 302,265

9 Claims. (Cl. 83—11)

The present invention relates to improvements in pulverizers and has particular reference to an alfalfa mill used for turning alfalfa hay into alfalfa meal. More particularly it has reference to the rotary type of mill, in which a rotary beater is mounted in a suitable housing, the hay being introduced into the housing in axial direction and the comminuted material being discharged radially, a screen being interposed between the beating zone and the discharge.

In the present invention it is proposed to provide a number of improvements in the type of mill now being used, whereby the mill is rendered more efficient in operation and is simplified in construction.

More particularly it is proposed to provide for a better control of the air currents passing through the mill whereby a more generous amount of air is made to circulate through the mill and eddy currents are by-passed and made to join the main current so that all dead air pockets are avoided.

It is further proposed to arrange the rotor or beater in the machine in such a manner that the material under treatment is evenly distributed through the housing.

It is further proposed in the present invention to provide means on the rotor for dragging hay from the entrance into the housing whereby the feeding of the hay is improved, particularly where the hay is fed in the form of bales, or shows a tendency to bunch at the entrance to the housing.

It is a further object of my invention to provide improved mounting means for the rotor whereby the weight is balanced to better advantage than in existing mills.

And finally it is proposed to provide certain improvements in construction whereby the mill is simplified and more easily assembled.

Further objects and advantages of my invention will appear as the specification proceeds.

The preferred form of my invention is illustrated in the accompanying drawing in which:

Figure 1 shows a vertical transverse section through my mill;

Figure 2, an axial section taken along line 2—2 of Figure 1, and

Figure 3, a detail view of a beater and associated parts as seen from line 3—3 of Figure 1.

While I have shown only the preferred form of my invention, I wish to have it understood that various changes or modifications may be made within the scope of the claims hereto attached without departing from the spirit of the invention. Particularly I wish to have it understood that the features of my invention are not confined to an alfalfa mill but may be used in connection with any material having similar characteristics.

Referring to the drawing in detail, my mill 1 may be supported on any suitable base 2 which is here illustrated as composing four angle irons 3 arranged in rectangular relation and joined by a plate 4. The mill comprises a housing 5 and a rotor 6 confined in the same.

The housing is made of two end plates 7 and 8 rising vertically from the base in spaced and parallel relation and being secured thereto by means of flanges 9 and 10. The plates are of identical form and each comprises a rectangular body section 11 and a tapered top section 12. Between the plates is supported the shell of the housing comprising a semi-cylindrical section 13, vertical sections 14 and 15 rising from the upper edges of the semi-cylindrical section and inclined sections 16 and 17 tapering toward one another and terminating in a restricted outlet 16', which latter connects, through a conduit 18, with a cyclone collector not shown.

In manufacturing my pulverizer, I preferably make the semi-cylindrical section 13, the vertical sections 14 and 15 and the inclined sections 16 and 17 in one piece, referred to as shell 19, and the latter is clamped between the rear plate 8 and the front plate 7 by a series of bolts 20 surrounding the shell as shown in the drawing.

In the housing is supported a screen or perforated plate 23 which is semi-cylindrical in form and is secured to the vertical shell sections 14 and 15 by means of bolts 23 in such a manner that it complements the lower semi-cylindrical section to form a complete cylinder.

The rear plate 8 is preferably made with a removable middle section 8' for facilitating the insertion and removal of the screen.

It will be noted that the inclined shell sections 16 and 17 are spaced from the screen sufficiently to form pockets 24 and 25 respectively, and in order to control and provide an outlet for eddy currents that may form in these pockets, I provide two baffles 26 and 27 which run parallel to the inclined shell sections 16 and 17 and the walls of the outlet 16' so as to form by-passes 28 and 29. The baffles are welded to the front plate 7 and contact the rear plate 8.

Inside of the cylinder I provide the rotor or beater 6 mounted on the shaft 30. The rotor comprises a flat plate 31, mounted so as to be closer to the rear plate 8 than to the front plate 7, as shown in Figure 2, and having a plurality of arms projecting therefrom. Each arm carries at its extremity a beater plate 33 which extends transversely through the cylinder substantially from the front plate to the rear plate and is slightly inclined to the axis of rotation, as shown in Figure 3, so as to have a tendency to feed the material in the cylinder toward the rear plate during its rotation.

The front plate has a large entrance opening 34 which connects with trough 35 which latter is preferably inclined to feed hay into the mill by gravity. In order to facilitate the feeding, particularly of baled hay, I provide a number of prongs 36 on the rotor, the prongs being arranged opposite the opening so as to tear into the hay projecting through the opening and to drag the hay into the mill. The prongs are preferably arranged at different distances from the axis of rotation so that they attack the hay at different points.

They are grouped around the axis of rotation substantially within the confines of the opening and the opening is arranged substantially centrally with respect to the drum so that all the prongs are active on a bale of hay or block of other material corresponding substantially to the size of the opening at the same time.

The prongs are shown in the form of rounded pins and present blunt or rounded front faces in the direction of rotation, so that when they rip into the material, they have no tendency to cut through the same, but rather tear it loose and whirl it toward the wall of the drum.

It will further be noticed that the prongs project from the face of the rotor toward the intake opening through a considerable distance so as to extend beyond the outline of the face of the rotor which is here shown as being substantially flat. It is apparent that if the prongs were very short or did not project beyond the outline of the rotor, or a projecting hub structure or other obstacle, they would be either ineffective or their ineffectiveness would be lessened considerably, depending upon the nature of the material fed and the degree to which such obstacle would prevent engagement of the prongs with the material.

The shaft 30 is mounted, outside of the housing, in bearings 37 and carries, at its outer end, a pulley 38 to which power may be applied in any suitable manner. It will be noted that the pulley and the rotor are mounted on opposite sides of the bearings so that they tend to balance one another.

The operation of the mill should be readily understood from the foregoing description. The hay is fed, loose or in bales, over the trough into the cylinder. If the hay is closely compressed, as in bales, or otherwise bunched, the prongs 36 of the revolving rotor will tear it up and drag it into the mill. The beaters then act on the bale of hay to pulverize it. At the same time a draft of air is set up, the air coming in through the opening 34 and being discharged through the screen, which latter is of relatively thin material and holds back portions of the hay which have not been sufficiently reduced.

The normal tendency of the air, which carries the pulverized material along with it, is to discharge in tangential direction. Since the rotor rotates clockwise (see Figure 1), the laden air will first discharge into the pocket 24 and through the by-pass 28 which lies practically in the normal path of air discharged by centrifugal force. A further portion of the air will, of course, discharge into the main channel of the discharge conduit, that is into the hood formed by the baffles 26 and 27.

The major part of this air will also move upward. A remaining portion of air, finally will reach the pocket 25, but instead of returning into the mill, will be drawn upward into the by-pass 29 on account of suction created by the air forced through the conduit 18. Thus air may be discharged through practically the entire screen area to insure a free flow and with such a large exhaust area available, the intake may be increased correspondingly, as compared with mills now on the market.

The angular position of the beaters serves to better distribute the material throughout the mill. Where straight blades are used I find that usually only the front portion of the mill renders effective service, while the rear section, adjacent the wall 8, carries but little material. With my inclined blades a considerable portion of the material is crowded toward the back wall and the capacity of the mill is increased accordingly.

I claim:

1. In a pulverizer for alfalfa hay or the like, a housing having parallel end walls, a semi-cylindrical bottom section, vertical sides rising from the edges of the bottom section and inclined sections rising from the vertical sections and tapering to a restricted outlet, a semi-cylindrical screen arranged in the housing complementary to the bottom section and forming pockets with the side sections and means for by-passing eddy currents formed in the pockets into the outlet.

2. In a pulverizer, a housing having end walls, a semi-cylindrical bottom section, vertical side sections rising from the bottom section, and inclined sections rising from the vertical sections and tapering to a restricted outlet; a semi-cylindrical screen extending between the end walls with its concave face presented downwardly in complementary relation with the bottom section and coacting with the latter to define a cylindrical reducing chamber, the screen forming pockets with the side sections, means for introducing material into the reducing chamber, a rotor in the reducing chamber having beaters thereon, and a pair of baffles mounted in substantially parallel relation with the inclined housing sections and coacting therewith to provide by-passes leading directly from the pockets to the housing outlet, the baffles being spaced from each other to define a main outlet therebetween.

3. In a pulverizer, a housing having end walls, a semi-cylindrical bottom section, vertical side sections rising from the bottom section, and inclined sections rising from the vertical sections and tapering to a restricted outlet, a semi-cylindrical screen extending between the end walls with its concave face presented downwardly in complementary relation with the bottom section and coacting with the latter to define a cylindrical reducing chamber, the screen forming pockets with the side sections, means for introducing material into the reducing chamber, a rotor in the reducing chamber having beaters thereon, and a pair of baffles mounted in substantially parallel relation with the inclined housing sections and coacting therewith to provide by-passes leading directly from the pockets to the housing outlet, the baffles being spaced from each other to define a main outlet therebetween, the main outlet having a greater cross-sectional area than either by-pass.

4. In a pulverizer, a housing having end walls, a semi-cylindrical bottom section, vertical side sections rising from the bottom section, and inclined sections rising from the vertical sections and tapering to a restricted outlet; a semi-cylindrical screen extending between the end walls with its concave face presented downwardly in complementary relation with the bottom section and coacting with the latter to define a cylindrical reducing chamber, the screen forming pockets with the side sections, means for introducing material into the reducing chamber, a rotor in the reducing chamber having beaters thereon, and a pair of baffles mounted in substantially parallel relation with the inclined housing sections and coacting therewith to provide by-passes leading directly from the pockets to the housing outlet, the baffles being spaced from each other to define a main outlet therebetween, the lower ends of the baffles being disposed below the top of the screen and spaced substantially midway between the screen and the adjacent inclined housing sections.

5. In a pulverizer; a housing having end walls, a semi-cylindrical bottom section, vertical side sections rising from the bottom section, and inclined sections rising from the vertical sections and tapering to a restricted outlet; a semi-cylindrical screen extending between the end walls with its concave face presented downwardly in complementary relation with the bottom section and coacting with the latter to define a cylindrical reducing chamber; the screen forming pockets with the side sections; means for introducing material into the reducing chamber; a rotor in the reducing chamber having beaters thereon; and a pair of baffles mounted in substantially parallel relation with the inclined housing sections and coacting therewith to provide by-passes leading directly from the pockets to the housing outlet; the baffles being spaced from each other to define a main outlet therebetween, the housing and baffles being symmetrically disposed on opposite sides of a vertical central plane passing through the axis of rotation of the rotor.

6. In a pulverizer; a housing having end walls, a semi-cylindrical bottom section, vertical side sections rising from the bottom section, and inclined sections rising from the vertical sections and tapering to a restricted outlet; a semi-cylindrical screen extending between the end walls with its concave face presented downwardly in complementary relation with the bottom section and coacting with the latter to define a cylindrical reducing chamber; the screen forming pockets with the side sections; means for introducing material into the reducing chamber; a rotor in the reducing chamber having beaters thereon; and a pair of baffles mounted in substantially parallel relation with the inclined housing sections and coacting therewith to provide by-passes leading directly from the pockets to the housing outlet; the baffles being spaced from each other to define a main outlet therebetween; one end wall having a removable section extending above and below the screen to allow lateral removal of the screen.

7. In a pulverizer, a cylindrical housing having peripheral perforations and a central axial intake, a rotor in the housing having a receiving face opposite the intake and substantially co-extensive therewith, an inclined trough leading to the intake and being adapted to feed a bale of hay or the like by gravity upon the face of the rotor, individual ripping prongs projecting from the face of the rotor toward the intake, the prongs being evenly distributed around the axis of rotation and being disposed at different radial distances therefrom to describe concentric paths when the rotor rotates, and the radial spacing of the prongs being such as to cause the concentric paths to evenly cover an area substantially co-extensive with that of the intake opening whereby the entire front surface area of the bale of hay is simultaneously torn into by the prongs for ripping bunches of hay therefrom and for throwing the bunches outwardly for substantially uniform distribution through the housing, and fixed transverse blades at the outer end of the rotor and in close proximity to the periphery of the housing for drawing the separated bunches outwardly and for whirling them against the walls of the perforations whereby the hay is comminuted and discharged through the perforations in the form of relatively fine particles.

8. In a pulverizer, a cylindrical housing having peripheral perforations and a central axial intake, a rotor in the housing having a receiving face opposite the intake and substantially co-extensive therewith, a trough leading to the intake and being adapted to guide a bale of hay or the like upon the face of the rotor, individual ripping prongs projecting from the face of the rotor toward the intake, the prongs being evenly distributed around the axis of rotation and being disposed at different radial distances therefrom to describe concentric paths when the rotor rotates, the radial spacing of the prongs being such as to cause the concentric paths to evenly cover an area substantially co-extensive with that of the intake opening whereby the entire front surface area of the bale of hay is simultaneously torn into by the prongs for ripping bunches of hay therefrom and for throwing the bunches outwardly for substantially uniform distribution through the housing, and transverse blades at the outer ends of the rotor and in close proximity to the periphery of the housing for drawing the separated bunches outward and for whirling them against the walls of the perforations whereby the hay is comminuted and discharged through the perforations in the form of relatively fine particles.

9. In a pulverizer, a cylindrical housing having a central axial intake, a rotor in the housing having a receiving face opposite the intake and substantially co-extensive therewith, a trough leading to the intake and being adapted to feed a bale of hay or the like upon the face of the rotor, individual ripping prongs projecting from the face of the rotor toward the intake, the prongs being evenly distributed around the axis of rotation and being disposed at different radial distances therefrom to describe concentric paths when the rotor rotates, the radial spacing of the prongs being such as to cause the concentric paths to evenly cover an area substantially co-extensive with that of the intake opening whereby the entire front surface area of the bale of hay is simultaneously torn into by the prongs for ripping bunches of hay therefrom and for throwing the bunches outwardly for substantially uniform distribution through the housing and means on the rotor beyond the margin of the intake for comminuting the bunches of hay.

CLAIR T. ELDERKIN.